Oct. 24, 1967    M. J. SCALES    3,348,850
PIPE JOINT AND SEAL
Filed Jan. 27, 1967    3 Sheets-Sheet 1
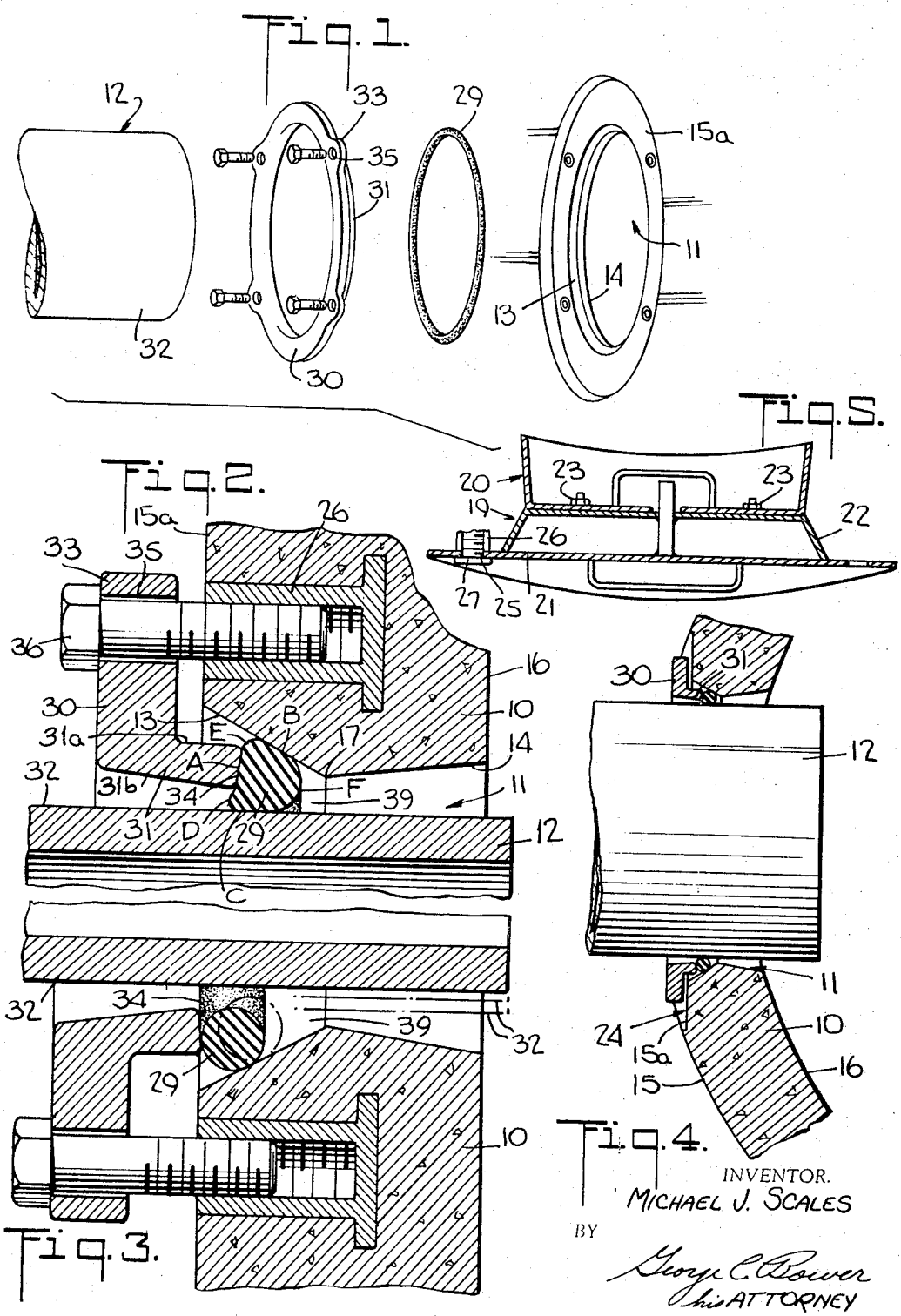
INVENTOR.
MICHAEL J. SCALES
BY
George C. Bower
his ATTORNEY INVENTOR.
MICHAEL J. SCALES
BY
George C. Bower
his ATTORNEY

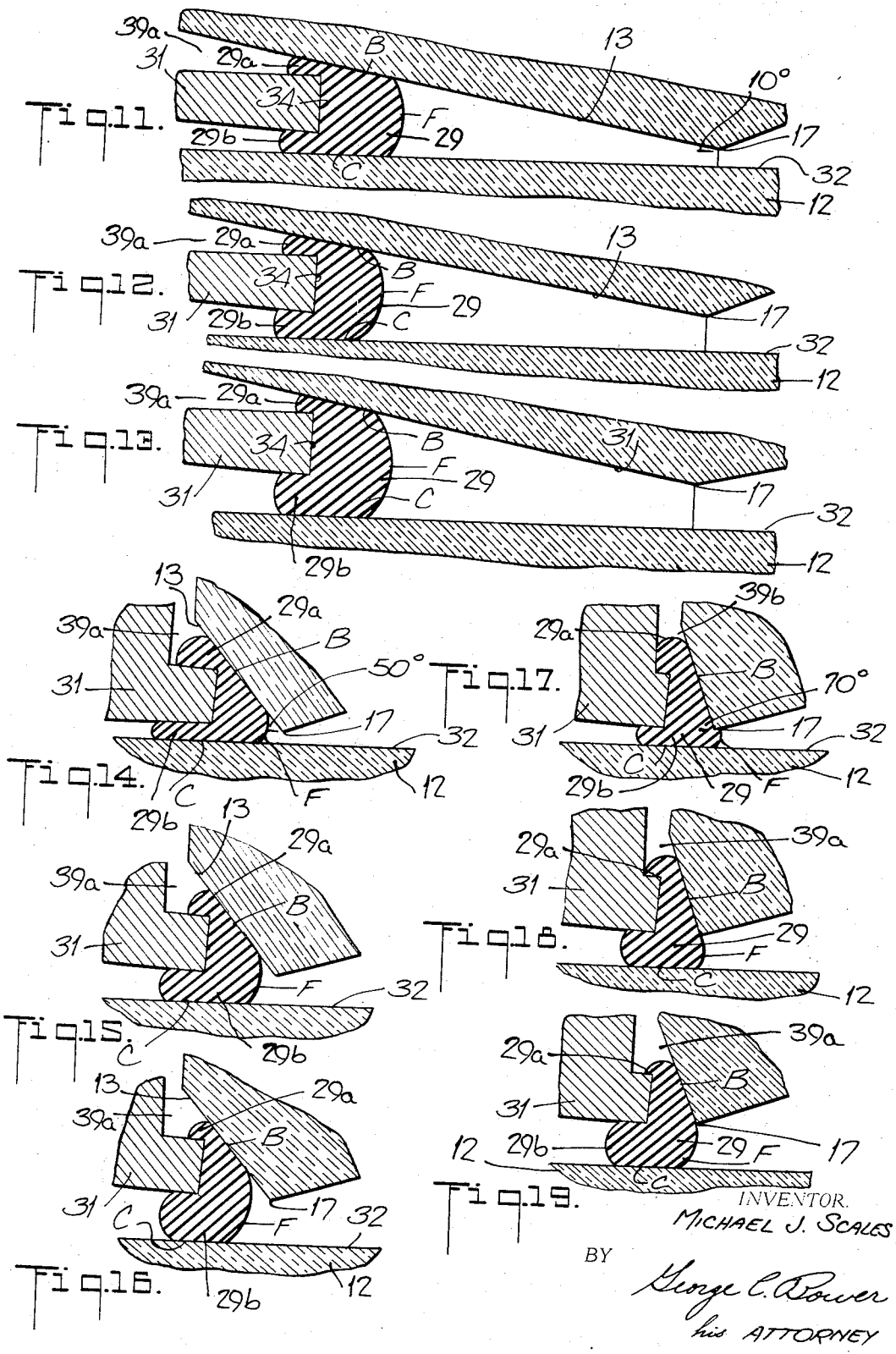

United States Patent Office

3,348,850
Patented Oct. 24, 1967

3,348,850
PIPE JOINT AND SEAL
Michael J. Scales, 248 Piermont Ave.,
Nyack, N.Y. 10960
Filed Jan. 27, 1967, Ser. No. 612,258
7 Claims. (Cl. 277—101)

ABSTRACT OF THE DISCLOSURE

A resilient ring-shaped seal is provided between the sloped walls forming an opening in a manhole and a pipe extending through the opening. An annular flange is forced against the resilient seal deforming the seal and pressing it against the sloped wall and pipe to seal the opening and tiltably support the pipe. The flange, sloped wall and pipe are spaced from one another to permit variation in the cross-sectional shape of the seal on circumferential variation in the spacing between the pipe and sloped wall.

Reference to related applications

This is a continuation-in-part of my co-pending application Ser. No. 362,094, filed Apr. 23, 1964, and entitled, "Pipe Joint and Seal," and now abandoned.

Background of the invention

The invention relates to pipe joints or couplings between rigid fluid conveying pipes and rigid fluid distributing structures and is directed particularly to sealing between rigid concrete, clay or asbestos underground pipe to a concrete manhole or the like by the pipe extending through the wall of the manhole.

The present method used in the field is to seal the annular space around the pipe with cement or to seal with a packing material and cement. With more precisely formed couplings and pipes various types of packings have been used. Most of these couplings have an annular member fitting closely to the pipe and forcing the packing into a confined space formed by a generally bell-shaped member and the interfitting pipe. Couplings of this type are best illustrated in the following United States patents: Nos. 2,087,752; 663,879; 2,391,900 and 658,899; and in the French Patent 734,002.

Summary of the invention

Although these small tolerance couplings may be satisfactory for precisely formed pipes and parts, they are unsuitable for conduit systems in which the pipes have a wide tolerance in outside diameter and are often angularly positioned in relation to openings through which they extend. This is particularly true in underground sewage systems in which the sewage pipes have rough irregular outer surfaces making it difficult to provide a satisfactory seal. Further, manholes are subjected to the pounding of passing vehicles and to settling or tilting due to their size and weight.

Another problem is the time required to seal the opening between the pipe and manhole. The pipe and manhole are usually below ground and the excavation in the ground is subject to slides and filling with water. The time for completing the sealing should be as short as possible to minimize labor costs and hazards to the workmen.

Heretofore no adequate coupling has been provided which meets the foregoing conditions of wide variations in the size and configurations of the pipe and angularity of the pipe to the axis of the opening.

An object of the invention is to provide a pipe joint for irregularly shaped rough outer surface pipes.

Another object of the invention is to provide a resilient pipe joint that permits angular differences between a connecting pipe and the opening receiving the pipe.

Another object of the invention is to provide a permanent sealing pipe joint that is quickly and easily assembled.

Other and further objects and advantages will be apparent from the following description taken in connection with the drawings.

Brief description of drawings

FIG. 1 is an exploded view of the pipe and joint.
FIG. 2 is a fragmentary sectional view of the assembled joint.
FIG. 3 illustrates the adaptation of the joint to various size pipes.
FIG. 4 is a sectional view of the complete assembly.
FIG. 5 is a sectional view illustrating the mold forming the opening in the manhole.
FIGS. 11 to 13 sectionally and fragmentarily illustrate along a radial plane an embodiment with the sloped wall of the opening at an angle of 10° and at the pipe diameters of FIGS. 7 to 9.
FIGS. 14 to 16 sectionally and fragmentarily illustrate along a radial plane an embodiment with the sloped wall of the opening at an angle of 50° and at the pipe diameters of FIGS. 7 to 9.
FIGS. 17 to 19 sectionally and fragmentarily illustrate along a radial plane an embodiment with the sloped wall of the opening at an angle of 70° and at the pipe diameters of FIGS. 7 to 9.

Detailed description

Figure 6:
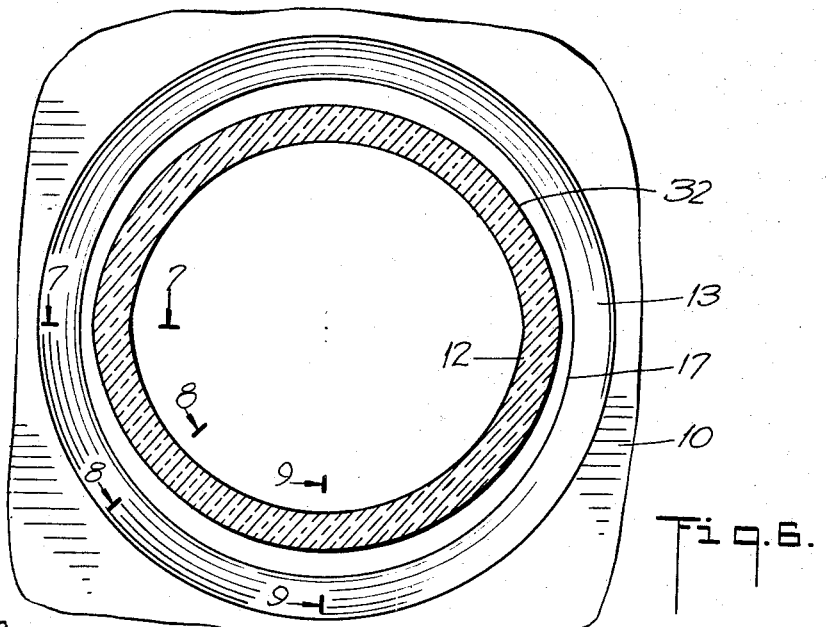
FIG. 6 is a fragmentary side view of the manhole opening and a sectional view of a pipe with an elliptical shape.

The wall 10 of a manhole or the like is fragmentarily shown in the drawings and has an opening 11 extending therethrough for receiving the end of a pipe 12. The opening 11 is generally circular in shape and is formed by circular walls 13 and 14. The wall 13 extends inwardly from the flat portions 15a of the exterior wall 15 of the manhole wall 10. The wall 14 extends outwardly from the inner surface 16 of the manhole wall 10 to join with the wall 13 at the circular juncture 17 defining the minimum diameter of the opening.

The opening 11 is formed at the time of the casting of the manhole wall 10 by means of steel forms 19 and 20 (FIG. 5). The form 19 has a flat disc member 21 and a truncated conical member 22. The form 20 is of a slight truncated conical shape and is joined with the form 19 by the fastening means 23. The flat disc member 21 has a greater diameter than the member 22 to form the planar or flat wall portion 15a around the opening 11. On the setting of the manhole wall 10 the fastening means 23 may be disconnected and the forms 19 and 20 separated, leaving the opening 11 and a recess 24 concentric to the opening. The flat disc member 21 has openings 25 for supporting inserts 26 by fastening means 27. The four inserts 26 are circumferentially arranged around the opening 11 and are embedded in the wall 10. The wall 13 is tapered inwardly so as to face outwardly reducing the diameter of the opening 11 towards a midportion or juncture 17 of the manhole wall 10. The wall 13 forms an angle of about 30° with the main axis of the opening 11.

The pipe is supported and held in the opening by the resilient member 29 which is held in place by a cast iron ring member 30 secured to the wall 10. The pipe and conical shaped wall 13 form an annular space 39 around the pipe which tapers inwardly reducing the cross section of the space. The resilient member 29 is positioned in this space and held in firm sealing contact by the annular flange 31 projecting into the space 39.

The flange 31 has a flat circular surface 34 pressing against the resilient member 29 to distort and press it against the conical wall 13 and the exterior surface 32 of the pipe 12. Annular engaging or sealing portions A, B and C are formed with unengaged portions D, E and F therebetween, as illustrated in FIG. 2. Flange 31 has circumferentially spaced bosses 33 with openings 35. The openings 35 align with the inserts 26 and a bolt 36 is threaded into the insert to draw the flange 31 towards the manhole wall 10. The bolts 36 are tightened to force the resilient member 29 into firm sealing contact with the conical wall 13 and the cylindrical wall 32 of the pipe. Thus the space between the wall 13 and the pipe 12 is reduced towards the center of the manhole wall 10. The pipe 12 is spaced from the annular flange 31 so that contact between the pipe and flange is avoided. In addition to accommodating to variations in pipe diameter, the engagement of the pipe 12 of only the resilient member 29 permits the pipe 12 to enter the opening 11 within a range of angles so that the pipe does not have to be axially aligned with the opening 11.

The manhole wall 10 is concrete and the sloped surfaces 13 and 14 on the wall are also of concrete. The conduits or pipes 12 may be made of clay, asbestos and cement, cast iron, steel, plastic, concrete or the like. The outer surfaces of the pipes are rough and not designed for sealing. Clay, concrete or asbestos and cement pipes have extremely uneven rough outer surfaces.

In addition to the outer surfaces not being formed for sealing, the tolerances of the outer diameters of the surfaces may vary as much as half an inch of the diameter. Clay pipes are particularly irregular in configuration. The outer surface, instead of being circular, may be elliptical as illustrated in FIG. 6. Thus the annular space 39 in which the resilient member fits varies in size.

The resilient member in the undeformed state preferably has a circular configuration with a circular cross section. This is generally known as an O-ring. Other cross sectional shapes may be used as explained later herein. The material is preferably rubber. The hardness of the rubber may be in the range of 5–70 durometer with a lesser range of 30–60 durometer preferred. A rubber having a 40–50 durometer is the preferred commercial hardness.

The manhole wall 10 is made of concrete and the sloped surfaces 13 and 14 are also of concrete. The sloped surface 13 of opening 11 is preferably about 30° to the main axis of the opening. However, the angle may be in the range of 10° to 70° as illustrated in FIGS. 7–19.

In FIGS. 7–10 the sloped wall or surface 13 is at a 30° angle to the main axis of the opening and has an axial length L of about 1⅞". The pipe surface 32 has a diameter of about 9"±¼". The diameter may thus vary over half an inch. At the maximum diameter the inner end of the sloped surface or juncture 17 is about ⅛" from the pipe surface 32. The resilient ring or member 29 has a circular configuration with a diameter of 1³⁄₁₆" and preferably has a hardness of 40–50 durometer. The inner edge 34b of the radial surface 34 has a diameter of approximately 9⅜" and the outer edge 34a has a diameter of approximately 10½" so that the radial width of the surface 34 is approximately 9⁄₁₆". The resilient ring 29 is stretched to snugly fit on the outer surface 32 of the pipe 12. Thus the radial relationship of the flange and the undeformed resilient ring varies depending upon the outer diameter of the pipe.

Figure 7:
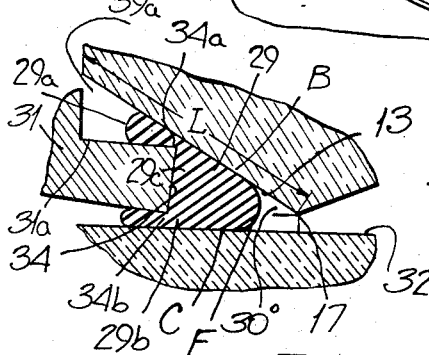
FIGS. 7 to 9 sectionally and fragmentarily illustrate along a radial plane an embodiment with the sloped wall of the opening at an angle of 30° and at pipe diameters taken along lines 7—7, 8—8 and 9—9 respectively of FIG. 6.
Figure 8:
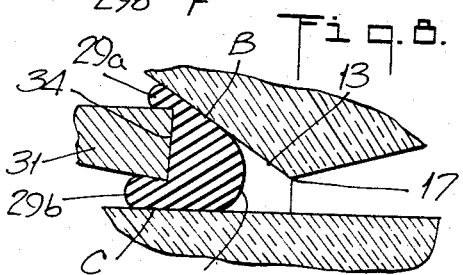
Figure 10:
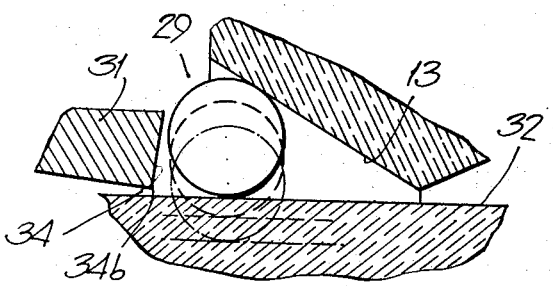
FIG. 10 is a fragmentary sectional view illustrating the resilient ring in solid, dotted and dot dash lines corresponding to the pipe diameters of FIGS. 7 to 9 respectively.
Figure 9:
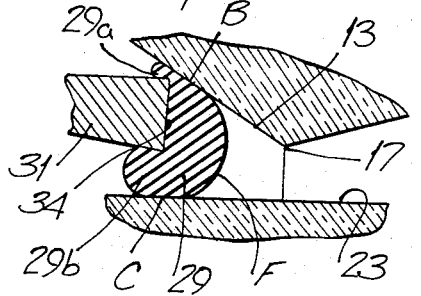

In FIG. 10 the undeformed resilient ring is shown in solid, dotted and dot dash lines corresponding to pipe diameters of FIGS. 7 to 9, respectively, prior to compression for illustrating the relationship of the ring to the flange, the pipe surface and sloped surface. The radial surface 34 axially faces over its width the undeformed resilient ring. The center of the O-ring 29 or the center of mass of a resilient ring is preferably at a greater radial distance than the inner edge 34b over the range of pipe diameters. At the maximum pipe diameter it is preferable that the spacing between the inner edge 34b and the outer pipe surface 32 is ¹⁄₁₆". The flange has an exterior axial surface 31a extending generally axial to form an unobstructed annular space 39a for receiving an annular protruding portion of the resilient ring. The flange is forced by the fastening means so that the outer edge 34a is spaced about ¹⁄₁₆" from the sloped surface. The resilient ring is deformed to provide an annular protruding portion 29a between the sloped surface 13 and the outer axial surface 31a of the flange, a first sealing area B along the sloped surface and a second sealing area C along the pipe formed by a pipe surface-engaging portion 29b of the ring. The radial surface 34 of the flange contacts the resilient ring 29 along an engaged surface or portion 29c of the ring.

The relationship between the flange 31 and the sloped surface 13 is substantially constant circumferentially due to the rigidity of the flange and the concrete wall. To adapt to the variations in pipe diameter the size of the protruding portion 29a and the size of the pipe-engaging portion 29b increase and decrease inversely. For small diameters the pipe-engaging portion 29b expands and the protruding portion 29a contracts. For large pipe diameters the pipe-engaging portion 29b decreases and the protruding portion 29a increases. There is also a variation axially of the unengaged portion F moving axially away from the flange at the large pipe diameters and moving towards the flange for small pipe diameters. This is illustrated in FIGS. 7–9. The hardness of the resilient ring creates large radial forces bearing against the sloped surface 13 and the pipe surface 32 to seal these surfaces. The variation of ½" for a 1³⁄₁₆" diameter ring maintains desired sealing pressures over sealing areas B and C. As seen, the cross-sectional diameter of the ring is over one and a half the tolerance of the pipe. Rings with larger cross-sectional diameters are used for larger variations in pipe diameter. For example, if the variation in diameter is ¾" a ring with a 1" cross-sectional diameter may be used. For other generally symmetrical configurations the radial length would be similarly determined.

The resilient ring 29, in addition to sealing the annular space and resiliently adjusting to different pipe diameters, also supports the pipe so that the pipe may be rocked or angularly tilted in relation to the axis of the opening while still maintaining the sealing relation of the sealing areas B and C. The flange has an inner axial surface 31b tapered at approximately 6° permitting the tilting of the pipe over at least a 10° arc. The second sloped surface 14 on the wall provides a space in the wall for this angular adjustment.

The angle of the sloped or conical surface 13 may be varied over a wide range. In FIGS. 11–13 the sloped surface 13 is 10° to the main axis of the opening. The pipe diameter is approximately 9" with ¼" tolerance and the resilient ring is 1" in diameter. As shown in these figures the resilient ring 29 has generally the same configuration as shown in FIGS. 7–9, thus permitting variation in pipe diameter and the angular tilting. The flange 31 is positioned in the same relation to the conical wall 13 for each diameter of the pipe 12. The flange 31 is spaced from the wall 13 to provide the space 39a. The protruding portion 29a and the pipe-engaging portion 29b change in size inversely to provide the sealing relation around the pipe.

In FIGS. 14–16 the sloped surface 13 is at a 50° angle to the main axis of the opening. The sealing surface B extends closer to the juncture point 17 so that the resilient ring 29 is more confined in the space between the radial surface of the flange and the sloped surface. However, the protruding portion 29a and the pipe-engaging portion 29b function in a similar manner as that shown in the embodiments of FIGS. 7–9. The relationship of the flange 31 and sloped wall 13 is the same.

In FIGS. 17–19 the sloped surface is at a 70° angle to the main axis of the opening. The resilient ring 29 extends to the juncture 17. The protruding portion 29a and the pipe-engaging portion 29b change in size inversely so as to accommodate the different pipe diameters.

Thus it is seen that the sloped walls may be at a range of angles of 10° to 70° with the main axis of the opening. The preferred range is 20° to 50° with 30° the preferred slope. The radial surfaces 34 are positioned at a circumeferential relation with a given sloped wall that is substantially constant which includes a tilted flange. The resilient ring in the foregoing embodiments is circular in cross section and this is the preferred form. However, other configurations with the axial and radial dimensions of the same order of magnitude may be used to provide a resilient member or means between the flange and the sloped wall that in the undeformed condition would extend into or overlap the concrete wall and the flange, and that in the deformed condition provides a resilient volume changing shape to maintain the sealing relationships on changes in diameter. The configuration of the resilient member also provides an unengaged portion F on the opposite side of the deformed resilient member from the flange. This assists the variation in volume of the resilient member.

Although the foregoing description has been directed to a pipe having a noncircular outer surface, the invention is also applicable to circular pipes which have wide variations in pipe diameter. Thus the seal may be freely used in the field without having to machine or true the surface of the pipe to a given diameter. Also, another feature of the seal is that the surface of the pipe may be quite rough and the high compressive forces in the resilient member conforms to this roughness and seals the pipe surface against leakage.

In addition to sealing the opening and supporting the pipe away from the walls of the opening, the compressed resilient ring locks the pipe in position and prevents the pipe from slipping into the manhole. Any inward movement tends to further compress the resilient ring increasing the gripping pressure on the pipe. Thus this connecting section of the pipe is firmly held between the manhole and the previous pipe section.

The pipe is easily and quickly mounted in the manhole by inserting the pipe in the opening and locking it on the previous section of pipe. The rubber ring 29 and flange 31 are previously positioned around the pipe. The rubber ring is forced into the annular space and the flange 31 tightly fastened to produce the desired compression and sealing action. It is thus seen that a watertight seal is formed between the pipe and the concrete manhole. The seal supports the pipe in spaced relation to the concrete manhole so as to prevent the contacting of the pipe and the manhole and thus isolate the two from transmission of bending moment in case the manhole should settle or the pipe shift in position. The rubber seal in addition to maintaining the sealing relation on shifting of either the pipe or the manhole also does not disintegrate under vibration or other forces transmitted by the manhole to the seal. The rubber seal also compensates and permits the pipe to extend into the opening at angles of several degrees from the axis of the opening, while maintaining the desired relationship between the pipe and manhole as previously described. Thus over the life of the system the joint will maintain a watertight seal and prevent leakage into the system.

The invention is set forth in the appended claims.

I claim:

1. A pipe joint and seal between a concrete side wall and a pipe having an unfinished generally cylindrical pipe surface with a diameter variation in the order of one-half an inch or more comprising a cross-sectionally circular resilient ring of 30 to 60 durometer hardness positioned around said pipe surface and having an undeformed cross-sectional diameter at least one and one-half the diameter variation, said side wall having an outer surface, a rough concrete circular-shaped axially sloped surface on said side wall having a minimum diameter forming an annular opening, said sloped surface extending from said minimum diameter outwardly substantially to said outer surface of said side wall, and a second surface on the other side of said opening from said sloped surface and spaced from said pipe a greater distance than said minimum dimension to permit angular positions of said pipe over a ten degree arc, a rigid annular ring member positioned around said pipe with an inner axially extending surface facing said pipe and flared outwardly therefrom to permit angular movement in cooperation with said second surface over a ten degree arc and having a generally radially extending surface facing said sloped surface with a radial width less than the undeformed cross-sectional diameter of said resilient ring, and said ring member forming with said sloped surface a radially exterior annular space for receiving a circumferential portion of said resilient ring, fastening means mounted in said concrete side wall and connected to said ring member for securing said ring member to said wall and deforming said ring into a radial surface-engaging portion and a sloped surface-engaging portion between said radially extending and sloped surfaces and into a radially interiorly pipe-engaging portion between said ring member and said pipe surface and a radially exteriorly protruding portion in said exterior annular space between said ring member and said sloped surface, said sloped surface-engaging portion engaging said sloped wall over a first sealing area, said pipe-engaging portion contacting said pipe surface over a second sealing area and having an unengaged area between said first and second sealing areas, said protruding portion and said pipe-engaging portion changing size inversely on changes in pipe diameter over a range of approximately one-half the cross-sectional diameter of said resilient ring while said deformed ring maintains the sealing relation with said sloped surface and said pipe surface and solely supports said pipe over a ten degree arc of angular positions.

2. A pipe joint and seal as set forth in claim 1 wherein said sloped surface is in a range of ten to seventy degrees with the main axis of said opening.

3. A pipe joint and seal as set forth in claim 1 wherein said unengaged area between said first and second sealing areas is axially on the other side of said ring from said radially extending surface and extends down to said pipe surface to provide an unsupported portion of said resilient ring opposite said radial surface for variation in configuration of said ring with changes in pipe diameter.

4. A pipe joint and seal as set forth in claim 3 wherein said sloped surface is at an angle of ten to fifty degrees with the main axis of said opening.

5. A pipe joint and seal as set forth in claim 3 wherein said radially extending surface has an outer peripheral edge spaced a distance in the order of 1/16" from said sloped surface.

6. A pipe joint and seal as set forth in claim 1 wherein said sloped surface is at an angle of fifty to seventy degrees with the main axis of said opening and said first sealing area is axially opposite to said radial surface-engaging portion and said radially extending surface has an outer peripheral edge spaced from said sloped surface.

7. A pipe joint and seal between a side wall and a pipe having a pipe surface with a tolerance in the order of one-quarter inch or more comprising a resilient ring of 5 to 70 durometer hardness around said pipe surface and having in the undeformed state a generally symmetrical cross-sectional shape with a radial width of at least one and one-half of the total variation, said side wall having an outer surface, a surface on said side wall axially sloped to a minimum opening, said sloped surface extending from said minimum opening outwardly substantially to said outer surface of said side wall, and a second surface on the other side of said opening from said sloped surface and spaced from said pipe a greater distance than said opening to permit angular positions of said pipe over a ten degree arc, a rigid annular ring member positioned around said pipe with an inner axially extending surface facing said pipe and flared outwardly therefrom to permit angular movement in cooperation with said second surface over a ten degree arc and having a generally radially extending surface facing said sloped surface with a radial width less than the undeformed radial width of said resilient ring, and said ring member forming with said sloped surface a radially exterior annular space for receiving a circumferential portion of said resilient ring, fastening means mounted in said side wall and connected to said ring member for securing said ring member to said wall and deforming said ring into a radial surface-engaging portion and a sloped surface-engaging portion between said radially extending and sloped surfaces and into a radially interiorly pipe-engaging portion between said ring member and said pipe surface and a radially exteriorly protruding portion in said exterior annular space between said ring member and said sloped surface, said sloped surface-engaging portion engaging said sloped wall over a first sealing area, said pipe-engaging portion contacting said pipe surface over a second sealing area and having an unengaged area between said first and second sealing areas, said protruding portion and said pipe-engaging portion changing size inversely on changes in pipe diameter over a range of approximately one-half the radial width of said resilient ring while said deformed ring maintains the sealing relation with said sloped surface and said pipe surface and solely supports said pipe over a ten degree arc of angular positions.

No references cited.

CARL W. TOMLIN, *Primary Examiner.*

THOMAS F. CALLAGHAN, *Examiner.*